US006625304B1

(12) United States Patent
Bruijns

(10) Patent No.: US 6,625,304 B1
(45) Date of Patent: Sep. 23, 2003

(54) METHOD OF DETECTING DISPLACEMENT OF A BLOCK OF PIXELS FROM A FIRST TO A SECOND IMAGE OF A SCENE

(75) Inventor: Johannes Bruijns, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/534,209

(22) Filed: Mar. 24, 2000

(30) Foreign Application Priority Data

Mar. 31, 1999 (EP) ............................................ 99201025

(51) Int. Cl.[7] .................................................. G06K 9/00

(52) U.S. Cl. ......................... 382/154; 382/294; 356/12; 348/699

(58) Field of Search ................................ 382/154, 294, 382/107, 106, 209; 356/12; 348/139, 47, 50, 416.1, 699

(56) References Cited

U.S. PATENT DOCUMENTS 4,825,393 A * 4/1989 Nishiya ...................... 702/152
5,734,743 A 3/1998 Matsugu et al. ............ 382/154
6,163,337 A * 12/2000 Azuma et al. ................ 348/43
6,456,660 B1 * 9/2002 Yokoyama ............. 375/240.16
6,463,164 B1 * 10/2002 Chiu et al. .................. 382/107

* cited by examiner

*Primary Examiner*—Amelia M. Au
*Assistant Examiner*—Virginia Kibler
(74) *Attorney, Agent, or Firm*—Russell Gross

(57) ABSTRACT

Displacement of a first block of pixels from a first to a second image of a scene is determined for applications of automated distance computation. The selection of corresponding blocks in the two images is performed and verified as follows. A first block is taken from the first image. A first region is selected from a set of first regions in the second image, so that a difference between an image content of the first region and of the first block is minimal among the set of first regions. A second block is taken from the second image, the second block containing at least part of the selected first region. A second region is selected from a set of second regions in the first image, so that a difference between an image content of the second region and of the second block is minimal among the set of second regions. A first displacement between the first block and the selected first region is compared with a second displacement between the second block and the selecting second region. If difference between the first and second displacement is significant, the correspondence between the blocks is treated as unreliable.

6 Claims, 2 Drawing Sheets

41
40
42
44-2
44-5
44-3
44-4
44-6
44-11
44-7
44-10
44-8
44-9
44-1

METHOD OF DETECTING DISPLACEMENT OF A BLOCK OF PIXELS FROM A FIRST TO A SECOND IMAGE OF A SCENE

The invention relates to a method of detecting displacement of a block of pixels from a first to a second image of a scene.

In one application of such a method, the first and second image are taken from different viewpoints and the displacement reflects parallax of objects in the scene. From U.S. Pat. No. 5,577,130 it is known to measure "depth" from such displacement (depth is the distance between the camera and an object). The depth of an object is inversely proportional to the displacement between the locations where that object is visible in the images from two different viewpoints.

It is desirable that displacement is detected reliably. An important source of unreliability is that one detects displacement of the block to a part of the image that does not depict locations the object concerned, but different locations with similar appearance, or even a different object. Similarly, in case the object is occluded in one of the images, one may detect displacement of an arbitrary different object at the expense of reliability.

U.S. Pat. No. 5,577,130 improves the reliability by starting with a small movement of the viewpoint. As a result it is known that the displacement will be small. This is used to constrain the region in which one has to search for the displaced block. Using the displacement found in this way, the displacement corresponding to larger movements of the viewpoint can be predicted. This in turn is used to constrain the region in which one has to search for the displaced block after a larger movement. Thus, the risk of selecting the wrong displacement is small.

It is a disadvantage of the known method that it imposes constraints on movements of the viewpoint.

It is an object of the invention to provide an opportunity to increase the reliability of the determination of displacements without imposing constraints on the movement of the viewpoint.

The method according to the invention provides for measuring depth by starting with a block from a first image from a first In an embodiment of the method according to the invention the process is repeated in a number of instances, but with a respective further image taking the place of the second image in each instance. Thus, a depth estimate is obtained for each instance together with a determination of the reliability of this depth estimate. The depth estimates that are considered reliable are composited (for example averaged) to obtain a final depth estimate. In this way a good depth estimate is obtained even if the object is occluded in the second image or some of the further images.

These and other advantageous aspects of the method according to the invention will be described using the following figures by way of illustrative example.

Figure 1:
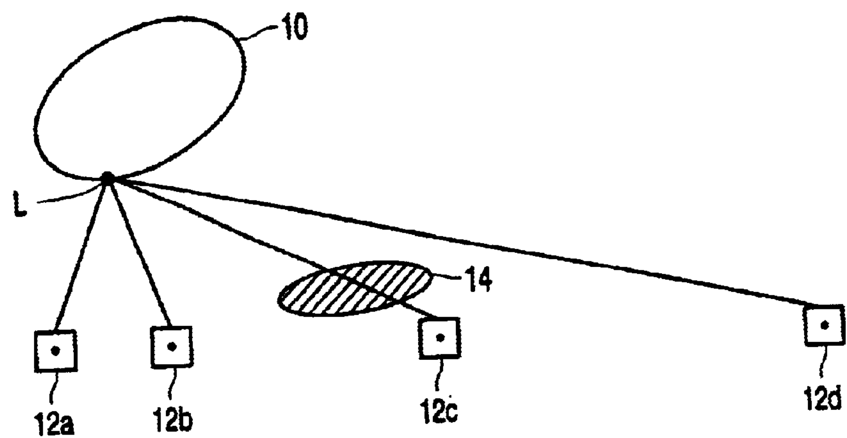
FIG. 1 shows the geometry of a scene with camera viewpoints.

FIG. 1 shows the geometry of a scene with camera viewpoints. In a cross-sectional view the figure shows an object 10 and a further object 14 and camera's at different viewpoints 12*a–d* relative to the objects 10, 14. (Although different camera's are shown, the camera's may alternatively be taken to represent the same camera located at different viewpoints at different points in time). A location L on the surface of object 10 is visible with camera's at viewpoints 12*a,b,d* but not from viewpoint 12*c*.

Figure 2:
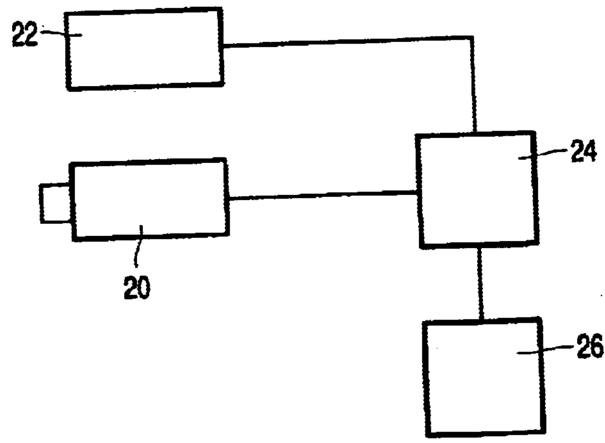
FIG. 2 shows a system for measuring depth.

FIG. 2 shows a system for measuring depth of locations like L, i.e. distance between the camera 12*a* and the location L on the object 10. The system contains a camera 20, a camera movement sensor 22, a computer 24 and a memory 26. The camera 20 and the camera movement sensor 22 have outputs coupled to the computer 24, which has an interface to memory 26.

Figure 3:
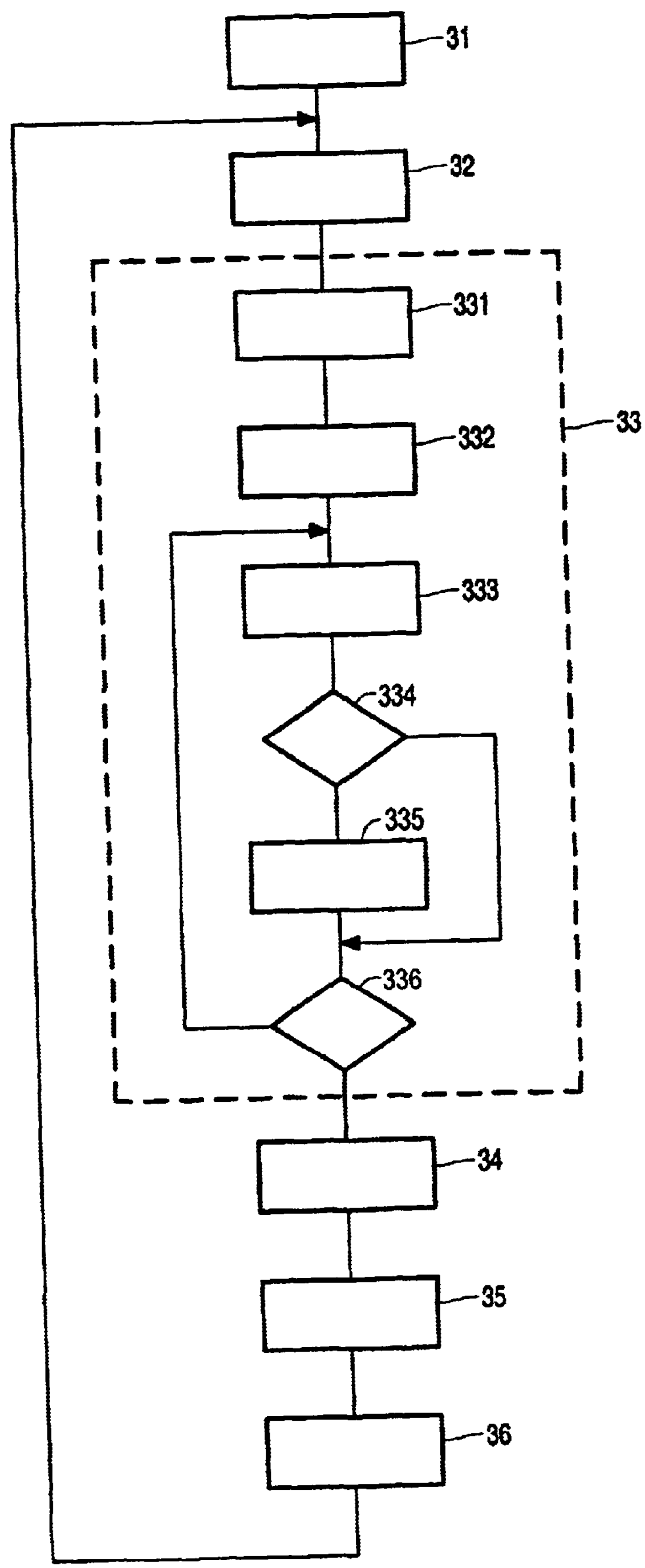
FIG. 3 shows a flow-chart for measuring reliable depth.

FIG. 3 shows a flow-chart for measuring reliable depth from the images. In a first step 31 the computer 24 stores a first image obtained with the camera 20 at a first viewpoint 12*a*. In a second step 32 the computer stores a second image obtained with the camera at a second viewpoint 12*b*. In a typical example of operation, a user holds the camera 20 and moves it to different viewpoints relative to a scene. As a result of the movement the same location L will be visible at different pixels in different images. The computer 24 can compute the distance of locations (like L) in the scene from the displacement between the positions of the different pixels.

In a third step 33 the computer selects blocks of pixels from the first image and searches for matching blocks of pixels in the second image.

Figure 4:
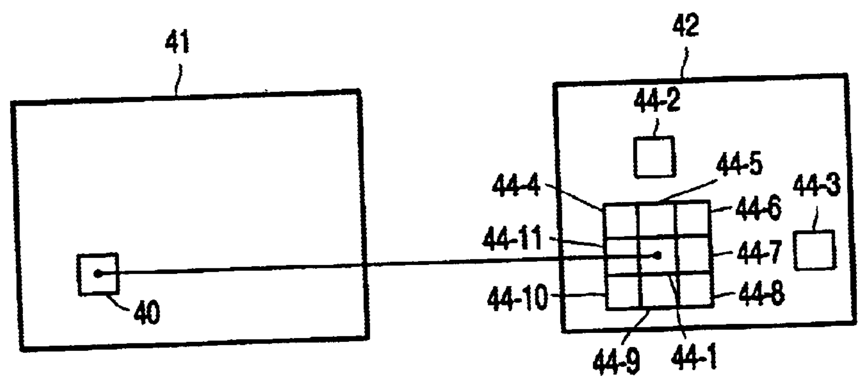
FIG. 4 shows a pair of images.

FIG. 4 shows the disposition of blocks 40, 44-1 to 44-11 in the first and second image 41, 42. A first block 40 is shown in the first image 41. A number of candidate blocks 44-1 to 44-11 is shown in the second image.

The third step 33 is divided into a number of sub-steps. In a first sub-step 331 the computer takes a first block 40 of a series of blocks (not shown) in the first image 41.

In a second sub-step 332 the computer selects a set of second blocks 44-1 to 44-11 in the second image. This set contains blocks to which the first blocks is likely displaced. The second set may be selected for example by displacing the first block 40 according to displacements found earlier for neighboring blocks in the first image 40, or for the same block in an earlier image; furthermore some second blocks 44-1 to 44-11 may be added at random or second blocks may be obtained displaced at randomly selected locations around other second blocks.

In a third sub-step 333 the computer takes a current second block of pixels 44-1, 44-11. This third sub-step 333 will be executed for a number of second blocks 44-1, 44-11. The computer 24 computes a measure of difference between the content of the pixels of the current second block 44-1 and the content of the pixels of the first block 40. Such a measure of difference is for example a sum of the absolute values of the difference between pixel values at corresponding location in the first and second block. Without deviating from the invention other measures of distance may be used (sum of squares, sum of differences between Fourier transform coefficients etc.).

In a fourth sub-step 334 the current measure of difference determined between the first block 40 and the current second block 44-1–44-11 is compared with the smallest measure of difference found so far for the first block. If the current measure of difference is smaller than the smallest measure of difference or the current second block is the first to be considered for the first block 40, a fifth sub-step 335 is executed. In this fifth sub-step 335 the current second block is marked as best matching second block and the smallest measure of difference is set to the current measure of difference.

After the fifth sub-step 335 or after the fourth sub-step 334 if the fifth sub-step 335 is not executed, a sixth sub-step 336 tests whether the third sub-step 333 has been processed for all second blocks in the set selected in the second sub-step 332. If not, the flow-chart repeats from the third sub-step 333 for an unprocessed second block.

Once the smallest measure of difference has been found among the set of second blocks that is considered for the first block 40, the displacement of the second block that led to that smallest measure of difference is assigned as displacement to the first block 40.

The displacement found for the first block 40 may be used to determine the depth of the locations of the object that are imaged in the first block. Preferably the computer uses sensed movements of the camera 20 for this purpose. The sensor 22 senses movements of the camera and reports these to computer 24. Computer 24 computes the relative positions of the camera from which the different images were taken and their relative orientation from the sensed movements and associates these positions with the corresponding images.

The sensor 22 simplifies the determination of depth, but it is not essential for the invention. Without the sensor it is still possible to obtain conclusions about the relative depth of different locations L in the scene. In a simple example a background at a far distance provides locations that may be regarded to be at a fixed position with respect to the camera. In this case relative depth of different locations in the foreground can be determined from different displacements of the pixels that show these different foreground locations L, the displacements being relative to the pixels that show the background. Similar, but more complicated determinations can be made when a "closer" object is used instead of the background.

The fourth step 34 of the flow-chart is similar to the third step 33 with the roles of the first and second image exchanged. That is, the computer takes the block from the second image and a set of blocks from the first image 41 and searches in the set of blocks from the first image for a block that best matches the block in the second image 42. This is applied to the block in the second image 42 that was found to be the best match to the block 40 in the first image. So, where the third step 33 generated a set of blocks from the second image 42 for the first block 40 and selected one block from that set, the fourth step 334 generates another set of blocks, this time from the first image 41 and select a best matching block from that set.

A fifth step 45 of the flow-chart compares the location of the original first block 40 and the block in the first image 41 that was selected via the third and fourth steps 33, 34. If these blocks are not at substantially the same location the displacement is marked as unreliable and is not used subsequently for the determination of depth (or given less weight in that determination).

The flow chart shows one way of using this detection of unreliability. After the fifth step the flow-chart is repeated from the second step 32, that is different second images are obtained with the camera 20 at different viewpoints relative to the scene. Each time a displacement is determined for the first block 40 from the first image in the third step 33 and a reliability of that displacement is determined in the fourth and fifth steps. A depth value is determined for the first block from the displacement found for the first block 40 and the sensed movement of the camera (sensed by means of the sensor 22 or from displacement of the image other objects). The depth values that have been found from different second images are combined in a sixth step 36, for example by averaging, those depth values that follow from displacements that have been marked as unreliable in the fifth step being disregarded. The average may be a normal average, or a running average (updated each time a new second image is available) a weighted average with increasing weight assigned according to increasing displaced and increasing reliability etc.

In case the location L on the object 10 that is visible in the first block is not visible in the image taken from one or more of the viewpoints 12*c*, the flowchart will cause the computer to disregard the displacement value found for that viewpoint in the computation of depth.

Of course the whole flow-chart is preferably applied to a number of different first blocks 40. This may be realized by including a loop that repeats the flow-chart for different first blocks in a grid of first blocks in the first image 41. Such a loop may include the third, fourth, fifth and sixth step 33, 34, 35, 36. Alternatively, the flow chart may loop through each of the third, fourth, fifth and sixth step 33, 34, 35, 36 individually. In this case the fourth step 34 is applied to a grid of blocks in the second image 42 and the fifth step 35 selects corresponding blocks pairs selected in the third and fourth steps 33, 34 respectively.

Preferably, the invention is implemented on a general purpose computer, programmed with a program with instructions to execute the various steps. However, instead of (or in addition to) the general purpose computer dedicated hardware may be used, which implement the steps or part of the steps. For example, one may provide dedicated hardware to compute the measure of difference between different blocks. In such hardware difference between different pixels of the blocks that are compared may be computed in parallel to speed up the computation. Similarly, the measures of difference between different pairs of blocks may be computed in parallel and the selection of best matching blocks may be performed in parallel for different blocks at the same time.

It will be appreciated that a great many alternative ways of implementing the invention can be conceived.

What is claimed is:

1. A method of detecting displacement of a first block of pixels from a first to a second image of a scene, the method comprising identifying the first block from the first image;

selecting a first region from a set of first regions in the second image, so that a difference between an image content of the first region and of the first block is minimal among the set of first regions;

identifying a second block from the second image, the second block containing at least part of the selected first region, selecting a second region from a set of second regions in the first image, so that a difference between an image content of the second region and of the second block is minimal among the set of second regions;

comparing a first displacement between the first block and the selected first region with a second displacement between the second block and the selecting second region;

using said first displacement for further processing only if there is substantially no difference between the first and second displacement.

2. A method according to claim 1, comprising obtaining a number of further images of the scene;

performing a search for each particular further image; wherein each search looks for a first region among a set of first regions in the particular further image, so that the image content of the first block and of the first region differs minimally among the set of first regions in the particular further image;

determining a respective displacement for each particular image, each respective displacement being between the first block and the first region for that particular image;

determining a respective depth measure from each particular displacement and from the first displacement;

compositing a final depth measure from the respective depth measures;

the first displacement being disregarded in said compositing if there is substantially no difference between the first and second displacement.

3. A method according to claim 2 wherein said compositing comprises taking an average of the respective depth measure and the first measure when the first depth measure is not disregarded.

4. A method of measuring depth from a first camera viewpoint to a location in a scene, the method comprising obtaining a first image of the scene from the first camera viewpoint;

obtaining a second image of the scene from a second camera viewpoint;

applying the method according to claim 1;

determining the depth of the part of the scene visible in the first block from said displacement.

5. A method according to claim 4, comprising obtaining a further second image of the scene from a further second camera viewpoint;

determining a further displacement value for the first block between the first image and the further second image;

determining a depth value for the first block from the further displacement averaging the depth value determined from the further displacement with a depth value obtained form the first displacement on condition that there is substantially no difference between the first and second displacement.

6. An apparatus comprising a circuit for measuring a distance between an image sensor and an object in a scene, the apparatus comprising the image sensor;

means for capturing a first and a second image from the image sensor, taken from different positions relative to the scene;

means for identifying the first block from the first image;

means for selecting a first region from a set of first regions in the second image, so that a difference between an image content of the first region and of the first block is minimal among the set of first regions;

means for identifying a second block from the second image, the second block containing at least part of the selected first region, means for selecting a second region from a set of second regions in the first image, so that a difference between an image content of the second region and of the second block is minimal among the set of second regions;

means for comparing a first displacement between the first block and the selected first region with a second displacement between the second block and the selecting second region;

means for enabling use of said first displacement for determining the distance between the image sensor and the object only if there is substantially no difference between the first and second displacement.

* * * * *